United States Patent
Son et al.

(10) Patent No.: US 8,178,248 B2
(45) Date of Patent: May 15, 2012

(54) CARBON MONOXIDE REMOVER AND FUEL CELL SYSTEM WITH THE SAME

(75) Inventors: In-Hyuk Son, Suwon-si (KR); Dong-Myung Suh, Suwon-si (KR); Dong-Uk Lee, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1195 days.

(21) Appl. No.: 11/325,967

(22) Filed: Jan. 4, 2006

(65) Prior Publication Data

US 2006/0154122 A1    Jul. 13, 2006

(30) Foreign Application Priority Data

Jan. 10, 2005  (KR) .................. 10-2005-0002120

(51) Int. Cl.
*H01M 8/06* (2006.01)
*C01B 3/38* (2006.01)
*C01B 3/58* (2006.01)

(52) U.S. Cl. ........... 429/412; 429/410; 429/423; 48/63; 48/128; 366/337

(58) Field of Classification Search .......... 429/12–46, 429/410–412; 48/63, 128; 422/198–208, 422/211–223; 55/434; 366/336–340
See application file for complete search history.

(56) References Cited

U.S. PATENT DOCUMENTS

| | | | | |
|---|---|---|---|---|
| 2,045,135 A | * | 6/1936 | Hanson | 181/268 |
| 3,733,785 A | * | 5/1973 | Gallaer | 96/64 |
| 5,346,391 A | * | 9/1994 | Fullemann et al. | 431/116 |
| 5,746,986 A | * | 5/1998 | Pollock et al. | 422/177 |
| 5,843,195 A | * | 12/1998 | Aoyama | 48/127.7 |
| 6,073,365 A | * | 6/2000 | Halverson et al. | 34/259 |
| 2003/0068540 A1 | * | 4/2003 | Ueda et al. | 429/22 |
| 2004/0037757 A1 | * | 2/2004 | Taguchi et al. | 422/188 |

FOREIGN PATENT DOCUMENTS

| | | |
|---|---|---|
| JP | 07-185303 | 7/1995 |
| JP | 10-245573 | 9/1998 |
| JP | 2000-254482 | 9/2000 |
| JP | 2000-260457 | 9/2000 |
| JP | 2000-268841 | 9/2000 |
| JP | 2003-165708 | 6/2003 |
| JP | 2003-206105 | 7/2003 |
| JP | 2004-175637 | 6/2004 |
| KR | 2003-0055147 | 7/2003 |
| KR | 10-2004-0100137 | 12/2004 |
| KR | 10-2004-0100958 | 12/2004 |

OTHER PUBLICATIONS

Korean Office action dated Jul. 20, 2011 issued to Korean Priority Patent Application No. KR 10-2005-0002120, listing the cited references in this IDS, 5 pages.
Patent Abstracts of Japan and English Machine Translation of Japanese Publication 2004-175637 listed above, 10 pages.

* cited by examiner

*Primary Examiner* — Basia Ridley
*Assistant Examiner* — Jacob Buchanan
(74) *Attorney, Agent, or Firm* — Christie, Parker & Hale, LLP

(57) ABSTRACT

A carbon monoxide remover includes a reactor body having an inner space, and a catalyst provided in the inner space of the reactor body to react with the reforming gas. A diffusion unit is installed at an inlet portion of the reactor body for introducing the reforming gas to diffuse the reforming gas over the entire area of the catalyst.

13 Claims, 6 Drawing Sheets

CARBON MONOXIDE REMOVER AND FUEL CELL SYSTEM WITH THE SAME

CROSS-REFERENCE TO RELATED APPLICATION

This application claims priority to and the benefit of Korean Patent Application No. 10-2005-0002120, filed on Jan. 10, 2005, which is hereby incorporated by reference for all purposes as if fully set forth herein.

BACKGROUND OF THE INVENTION

1. Field of the Invention

The present invention relates to a fuel cell system, and in particular, to a carbon monoxide remover which reduces the concentration of carbon monoxide in the reforming gas generated from a reformer.

2. Description of Related Art

Generally, a fuel cell is an electric power system which directly converts the energy of the chemical reaction of hydrogen in a hydrocarbon-based material such as methanol with oxygen or an oxygen-containing gas such as air, into electrical energy.

The fuel cell uses hydrogen made through reforming methanol or ethanol as a fuel, and has advantages in a wide range of uses such as mobile power for cars, distributed power for households and public buildings, and power for electronic appliances.

A fuel cell system is basically a stack, a fuel processor, a fuel tank and a fuel pump. The fuel processor includes a reformer for reforming a fuel to generate hydrogen, and a carbon monoxide (CO) remover for reducing the concentration of carbon monoxide in the hydrogen gas through a oxidation reaction of the hydrogen with oxygen (or air, referred to hereinafter as air). The CO remover, commonly known as a preferential CO oxidation (PROX) reactor, includes a reactor body with an inner space, and an oxidation catalyst provided therein.

However, with the CO remover, as pressured hydrogen and pressurized air are supplied to the reactor body, a channeling phenomenon is generated, in which hydrogen and air are concentrated in the center of the reactor body.

With the channeling phenomenon, the oxidation reaction of hydrogen and air by the oxidation catalyst occurs more intensely at the center of the reactor body, and the activity of the oxidation catalyst is diminished. For this reason, a conventional CO remover has lower efficiency, and cannot be effectively used for a fuel cell system.

SUMMARY OF THE INVENTION

One embodiment of the present invention is directed to a carbon monoxide remover which can prevent channeling of the hydrogen and air supplied into the reactor body.

In another embodiment of the present invention, a fuel cell system is provided utilizing the carbon monoxide remover.

According to one embodiment of the present invention, the carbon monoxide remover includes a reactor body having an inner space with a catalyst to react with a reforming gas. A diffusion unit is installed at the inlet portion of the reactor body for introducing the reforming gas such that the gas is diffused over the entire area of the catalyst.

In another embodiment, the reactor body may have the shape of a tube with two opposite open ended portions.

In a further embodiment, the catalyst may be pellet shaped, or a honeycomb type.

In one embodiment, the diffusion unit includes a diffuser having a body with a gradually increasing inner diameter, and with a plurality of nozzle pores.

In another embodiment, the nozzle pores may be gradually enlarged in size as they proceed along the central axis of the diffuser body.

In a further embodiment, the diffuser body is a cone shape.

In one embodiment, the catalyst may be an oxidation catalyst for preferentially oxidizing the reforming gas with the oxygen fed to the reactor body.

According to another embodiment of the present invention, the fuel cell system includes an electricity generator for generating electrical energy through the electrochemical reaction of hydrogen and oxygen, a reformer for generating the hydrogen from fuel through the reforming catalytic reaction based on thermal energy, a carbon monoxide remover for reducing the concentration of carbon monoxide in the hydrogen-containing reforming gas generated from the reformer, a fuel supply for supplying the fuel to the reformer, and an air supply for supplying air to the electric generator. The carbon monoxide remover includes a reactor body with an inner space, a catalyst provided in the inner space of the reactor body to react with the reforming gas, and a diffusion unit installed at the inlet portion of the reactor body diffuse the reforming gas over the entire area of the catalyst.

BRIEF DESCRIPTION OF THE DRAWINGS

The above and other advantages of the invention will become more apparent by describing exemplary embodiments thereof in detail with reference to the accompanying drawings in which.

DETAILED DESCRIPTION

Figure 1:
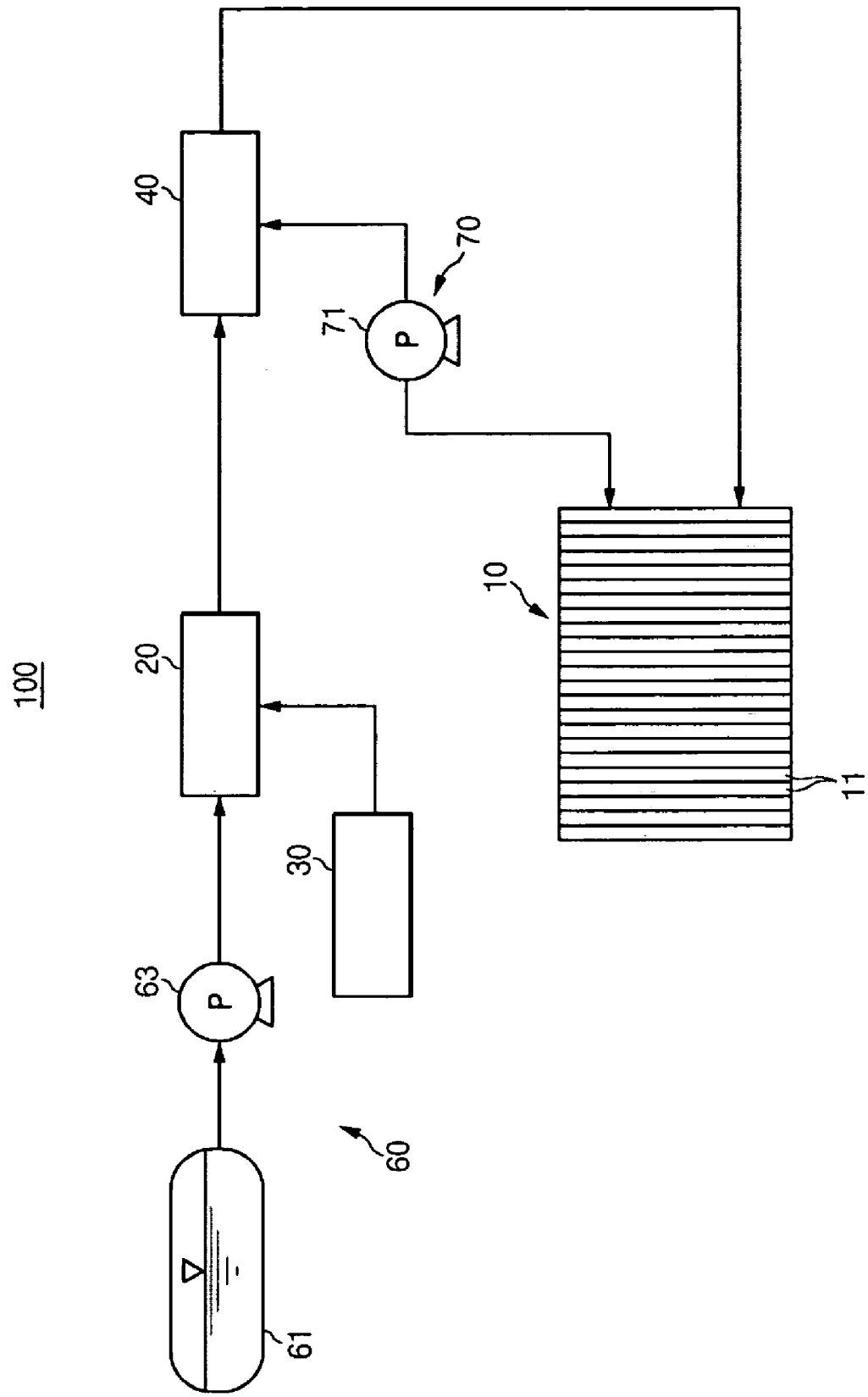
FIG. 1 is a block diagram of a fuel cell system according to one embodiment of the invention.

FIG. 1 is a block diagram of a fuel cell system according to one embodiment of the present invention, schematically illustrating the whole structure thereof.

As shown in FIG. 1, the fuel cell system 100 is based on a polymer electrolyte membrane fuel cell (PEMFC) where hydrogen, obtained by reforming a fuel, electrochemically reacts with an oxidation gas to generate electrical energy.

With the fuel cell system 100, the fuel refers to all the hydrogen-containing liquid or gaseous fuels such as methanol, ethanol and natural gases. The fuel to be described in the embodiments below is the liquid fuel.

Oxygen stored at a separate storage means or an oxygen-containing gas may be used as the oxidation gas. In this embodiment, the oxygen-containing gas is air and is used in the fuel cell system 100.

The fuel cell system 100 according to one embodiment includes a stack 10 with an electricity generator 11 for electrochemically reacting hydrogen with oxygen to generate electrical energy, a reformer 20 for generating hydrogen-containing reforming gas from a fuel through a chemical catalytic reaction based on thermal energy, a burner 30 for generating the thermal energy to supply it to the reformer 20, a CO remover 40 for reducing the concentration of carbon monoxide in the reforming gas through the preferential catalytic oxidation reaction of hydrogen with air, a fuel supply 60 for supplying fuel to the reformer 20, an air supply 70 for supplying air to the reformer 20, and an electricity generator 11.

Figure 2:
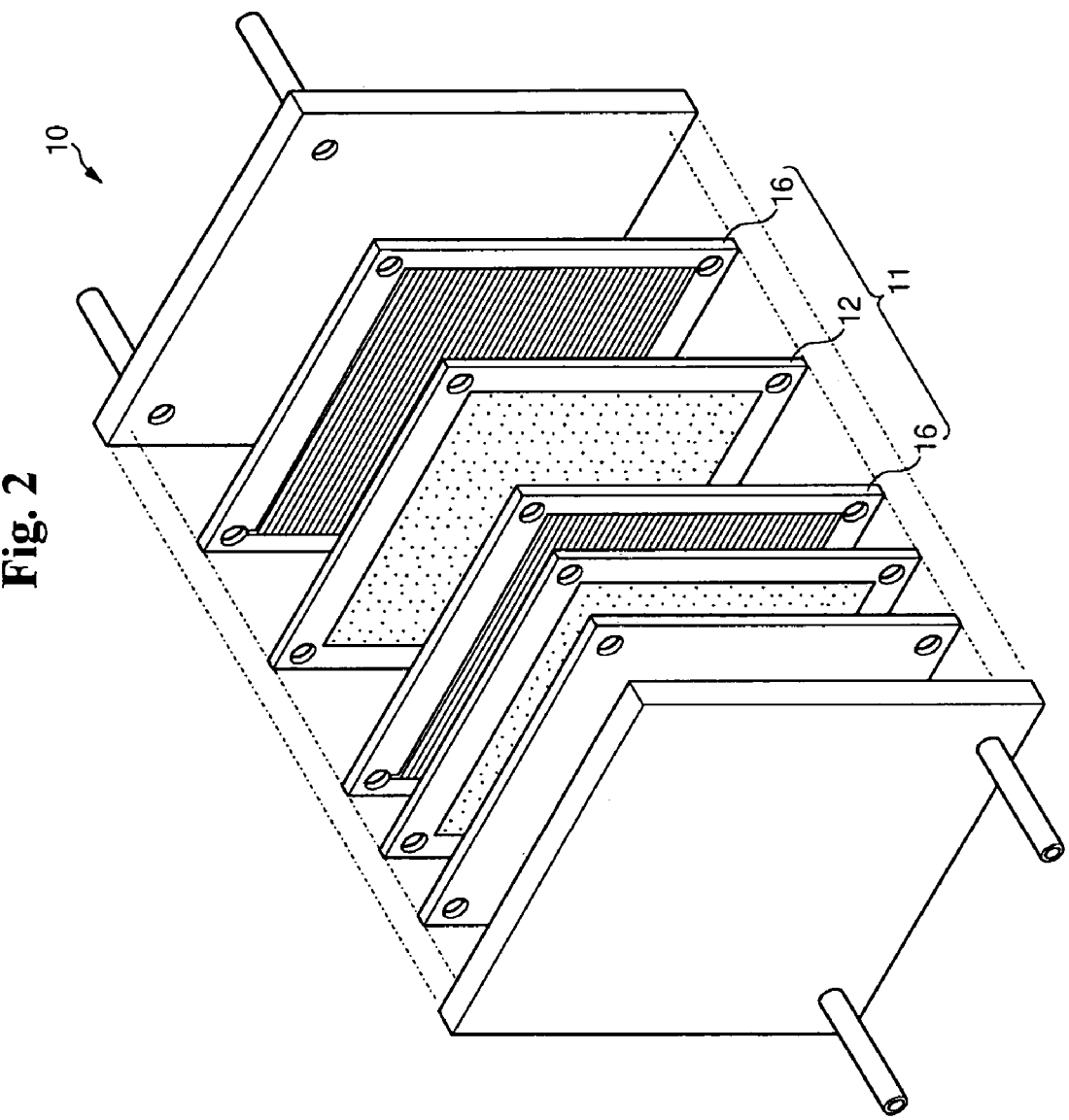
FIG. 2 is an exploded perspective view of a stack shown in FIG. 1.

FIG. 2 is an exploded perspective view of the stack 10 shown in FIG. 1. In one embodiment, the electricity generator 11 of the stack 10 forms a minimal fuel cell by having separators 16 on both lateral sides of a membrane-electrode assembly (MEA) 12, and the stack 10 may have an assembly structure with a plurality of minimal units of electric generators 11.

In an embodiment, the membrane-electrode assembly 12 has a predetermined active area capable of facilitating the electrochemical reaction of hydrogen and oxygen. The membrane-electrode assembly 12 has an anode electrode at its one side, a cathode electrode at the other side thereof, and an electrolyte layer disposed between the two electrodes.

In one embodiment, the specific structure of the stack 10 is a stack structure of a common polymer electrolyte membrane fuel cell, and hence, detailed explanation thereof will be omitted.

In an embodiment, the reformer 20 has the structure of a common reformer where hydrogen is generated from the fuel through the reaction of a reforming catalyst, based on a thermal source, such as steam reforming, partial oxidation, and a magnetic thermal reaction. In another embodiment, the reformer 20 may have a cylindrical reactor charged with a common catalyst for facilitating the reforming catalytic reaction. The reformer 20 may have a plate-type reactor where a channel is formed on a reactor plate, and a catalyst layer is formed on the inner surface of the channel.

In one embodiment, the burner 30, connected to the reformer 20 to supply thermal energy thereto, is a common-structured burner where thermal energy with a predetermined temperature range is generated by combusting a liquid fuel, such as methanol and ethanol, or a gaseous fuel such as methane gas and propane gas, together with air through the oxidation reaction of an oxidation catalyst.

The burner 30 is not limited to the above structure. In an embodiment, the burner 30 is a common-structured burner where the above-described fuel is ignited together with air, using a separate igniter, to generate a thermal source.

In an embodiment, the CO remover 40 for removing carbon monoxide from the reforming gas leaving the reformer 20, generates predetermined thermal energy through the preferential CO oxidation (PROX) catalytic reaction of the hydrogen with oxygen in the air, and reduces the concentration of carbon monoxide in the reforming gas.

The CO remover 40 will be explained later with reference to FIGS. 3 and 4.

Meanwhile, the fuel supply 60 for supplying a fuel to the reformer 20 includes a fuel tank 61 for storing fuel, and a fuel pump 63 connected to the fuel tank 61 to discharge the fuel stored in the fuel tank 61. The fuel tank 61 may be linked with the reformer 20 via a pipeline.

In one embodiment, the air supply 70 has an air pump 71 for discharging the air with a predetermined pressure to the electric generator 11 of the stack 10, and the CO remover 40. In this embodiment, as shown in the drawing, the air supply 70 supplies air to the electric generator 11 and the CO remover 40 by way of a single air pump 71, but is not limited thereto, and as such, the air supply 70 may be provided with a pair of air pumps connected to the electric generator 11 and the CO remover 40, respectively.

The fuel cell system 100, as described in the embodiments above, substantially controls the whole operation of the system, for example, the operation of the fuel supply 60 and the air supply 70, using a separate common control unit (not shown).

The structure of the CO remover 40 will be specifically explained with reference to the appended drawings.

Figure 3:
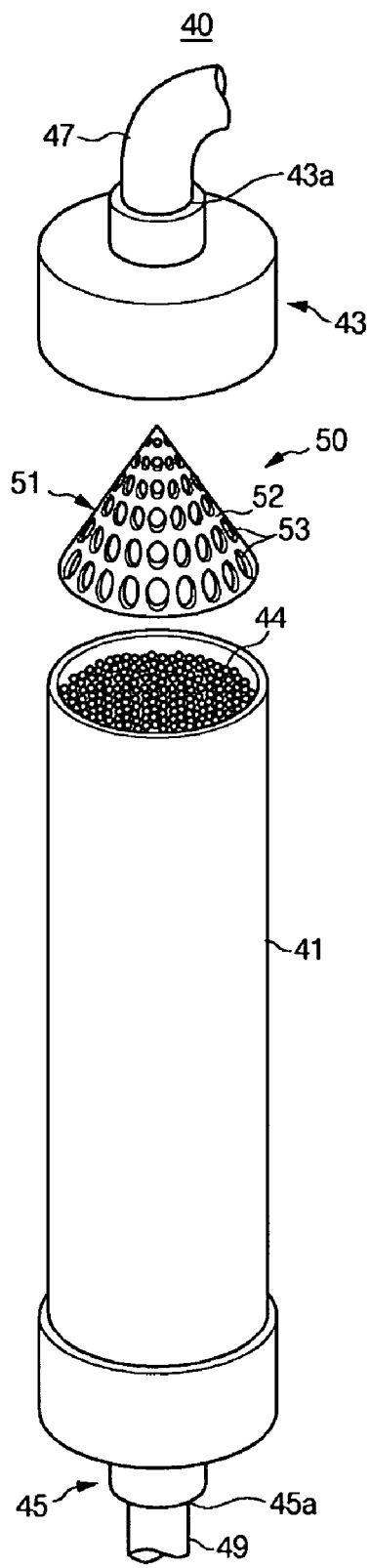
FIG. 3 is an exploded perspective view of a CO remover according to one embodiment of the invention.
Figure 4:
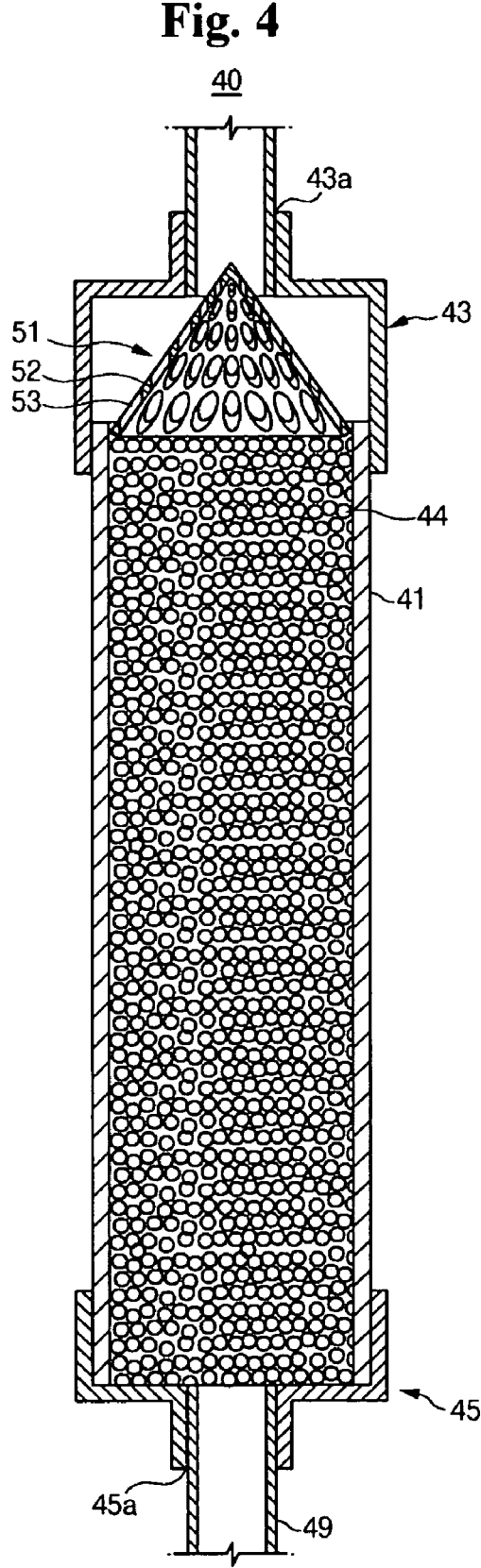
FIG. 4 is a sectional view of the CO remover shown in FIG. 3.

FIG. 3 is an exploded perspective view of a CO remover according to an embodiment of the present invention, and FIG. 4 is a combination sectional view of the CO remover shown in FIG. 3.

As shown in the drawings, the CO remover 40 has a cylindrical tube-shaped reactor body 41 with an inner space, and an oxidation catalyst 44 provided in the inner space of the reactor body 41.

In one embodiment, the reactor body 41 has a predetermined sectional area, and is pipe-shaped with two opposite open ended portions, and as the reactor body 41 is exposed to the outside, it may be formed with a common metallic or non-metallic heat insulator.

In another embodiment, an inlet portion 43 is formed at one end of the reactor body 41, to introduce the reforming gas generated from the reformer 20 and the air supplied by the air pump 71, and an outlet portion 45 is formed at the opposite end thereof to discharge the reforming gas which has a reduced carbon monoxide concentration.

In one embodiment, the inlet portion 43 has a round inlet 43a, and a manifold-shaped pipeline 47 is connected to the inlet 43a, such that the inlet portion 43 is linked to the reformer 20 and the air pump 71 via the pipeline 47.

In an embodiment, the inlet 43a of the inlet portion 43 has a sectional area smaller than that of the reactor body 41.

In another embodiment, the outlet portion 45 has a circular outlet 45a, and a pipeline 49, linked with the stack 10, is connected to the outlet 45a.

In a further embodiment, the oxidation catalyst 44 facilitates the preferential oxidation reaction of hydrogen and air, and has a pellet-shaped structure where a catalytic material, such as platinum Pt and ruthenium Ru, is placed in a pellet-shaped carrier comprising alumina $Al_2O_3$, silica $SiO_2$ or titania $TiO_2$.

In one embodiment, the CO remover 40 has a diffusion unit 50 for diffusing the hydrogen and air introduced into the reactor body 41 from the inlet portion 41a of the reactor body 41, over the entire area of the oxidation catalyst 44.

In an embodiment, the diffusion unit 50 includes a diffuser 51 disposed between the inlet portion 43 and the reactor body 41.

In one embodiment, the diffuser 51 has a cone-shaped body 52 where the point of the cone is oriented toward the inlet 43a, and the sectional area is gradually increased along the central axis thereof.

In an embodiment, the diffuser body 52 has a diameter gradually enlarged from the inner center of the reactor body 41 toward the outer periphery thereof, with the maximum diameter (the opening-sided diameter) of the diffuser body 52 corresponding to the inner diameter of the reactor body 41.

In another embodiment, the pointed end of the diffuser body 52 corresponds to the central axis of the reactor body 41, and is placed within the area of the inlet 43a of the inlet portion 43.

In a further embodiment, the open portion of the diffuser body 52 is inserted into the reactor body 41, and attached to the reactor body 41 through welding, fusion adhesion, or a separate attachment means.

In one embodiment, the structure and location of the diffuser 50 are made such that the hydrogen and air fed into the reactor body 41 through the inlet 43a are not concentrated upon the central axis of the reactor body 41, but diffused over the entire area thereof.

In an embodiment, a plurality of nozzle pores 53 are formed in the diffuser body 52 wherein the nozzle pores 53 are continuously or non-continuously circular in shape, and gradually enlarged in size from the pointed end of the diffuser body 52 toward the wide diameter portion thereof, meaning that the nozzle pores 53 are gradually enlarged in size from the central axis of the diffuser body 52 toward the outer circumference thereof.

In one embodiment, the enlargement of the nozzle pores 53 is made to prevent the channel phenomenon generated when the flow rate of the hydrogen and air fed into the reactor body 41 is gradually reduced from the center of the reactor body 41 to the outer periphery thereof due to pressure drop caused by the sectional area difference between the inlet 43a and the reactor body 41 as well as the frictional pressure drop of the supply pressure of the hydrogen and air.

The operation of a fuel cell system according to an embodiment of the invention will be now explained in detail.

In one embodiment, the burner 30 generates heat through the ignition and combustion of air and a fuel like methane gas or propane gas, or the catalytic oxidation reaction of a fuel with the air to generate heat, and supplies it to the reformer 20.

In an embodiment, the fuel pump 63 feeds the fuel stored in the fuel tank 61 to the reformer 20, and the reformer 20 receives the heat source, and generates a hydrogen-containing reforming gas from the fuel through a catalyst-based reforming reaction. Because the reforming reaction in the reformer 20 may not be 100% efficient, carbon monoxide typically exists in the reforming gas as a by-product.

In an embodiment, the reforming gas is fed into the reactor body 41 of the CO remover 40, and simultaneously, the air pump 71 is operated to supply air into the reactor body 41.

In one embodiment, the reforming gas and the air passing through the inlet 43a of the inlet portion 43 collide against the body 52 of the diffuser 51 so that they are diffused from the center of the reactor body 41 toward the outer circumference thereof via the nozzle pores 53.

In this state, as it goes from the center of the reactor body 41 toward the outer circumference thereof, the flow speed of the air passing through the respective nozzle pores 53 is gradually reduced. In an embodiment, as the respective nozzle pores 53 have a sectional area inversely-proportional to the air flow speed, the amount of the reforming gas and the air passing through the respective nozzle pores 53 can be constantly maintained.

Consequently, the CO remover 40 prevents the problematic channeling phenomenon, and feeds the reforming gas and the air over the entire area of the oxidation catalyst 44. The CO removal efficiency is significantly enhanced due to the uniform oxidation reaction on the oxidation catalyst 44 with respect to the whole interior of the reactor body 41.

In one embodiment, the reforming gas with CO removed is fed to the stack 10, and the electrical energy generated therefrom is applied to a predetermined load, such as a notebook, a PDA-like portable electronic appliance, or a mobile communication terminal, to be used as a driving energy source.

Figure 5:
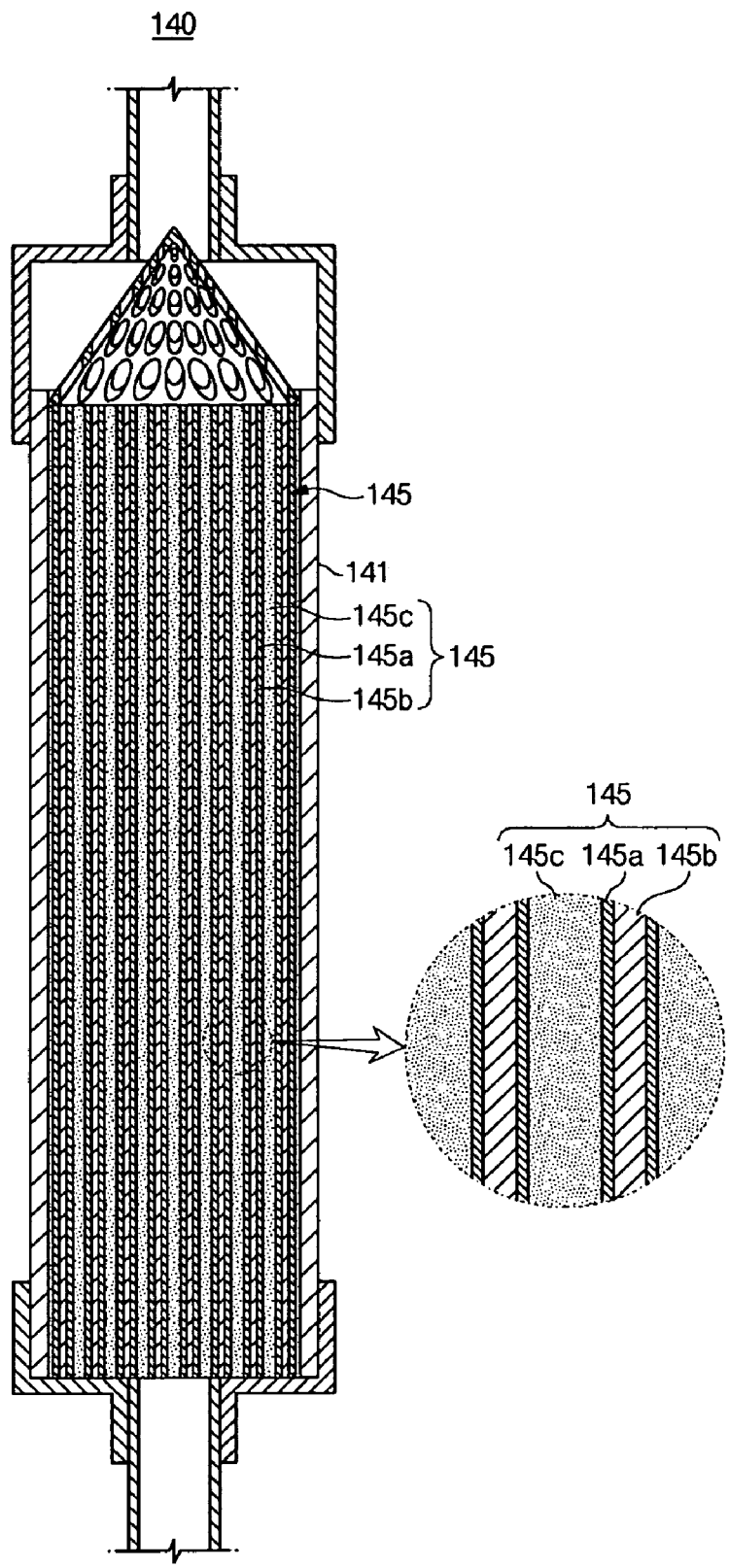
FIG. 5 is a schematic sectional view of a CO remover according to another embodiment of the invention.

FIG. 5 is a schematic sectional view of a CO remover according to another embodiment of the invention.

As shown in FIG. 5, the CO remover 140 according to one embodiment has the same basic structure as that related to the previous embodiments except that an oxidation catalyst 145 provided in the reactor body 141 is the honeycomb type.

In an embodiment, the honeycomb type oxidation catalyst 145 is longitudinally placed within the reactor body 141 with a plurality of through-holes 145a proceeding parallel to each other.

Figure 6:
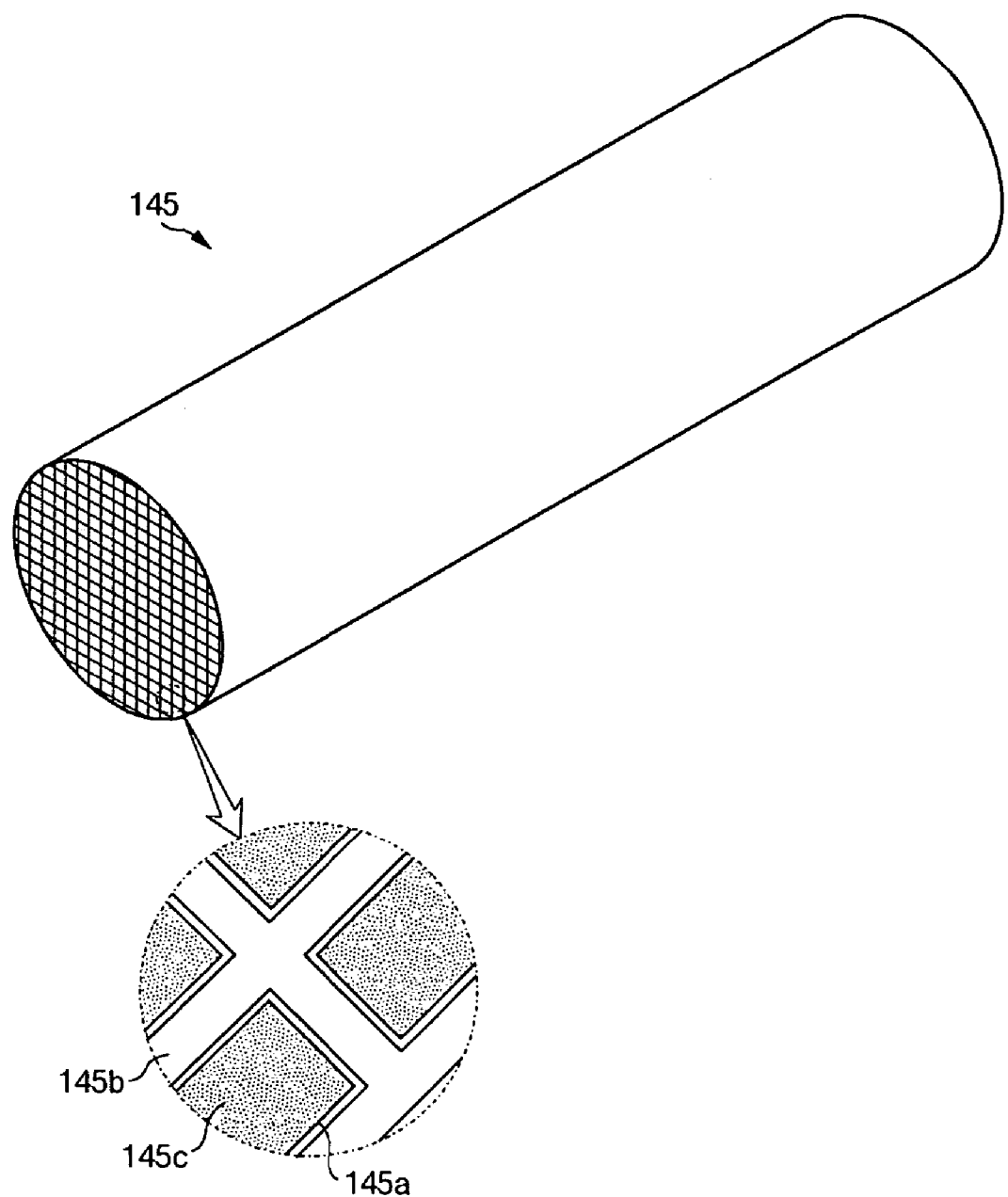
FIG. 6 is a perspective view of a catalyst of a CO remover according to another embodiment of the invention.

In one embodiment, as shown in FIG. 6, the oxidation catalyst 145 contains a plurality of through-holes 145a, formed in a ceramic or metal-based carrier 145b, and catalytic material 145c fills the interior of the through-holes 145a on the surface of the carrier 145b.

In one embodiment, the respective through-holes may be formed with various sectional shapes including a hexagon and a rectangle.

In an embodiment, the oxidation catalyst 145 circulates the reforming gas and air fed into the reactor body 141 via the through-holes 145a so that the diffusion of the reforming gas and the air over the entire area thereof can be efficiently made.

In one embodiment, the outer structure and operation of the CO remover 140 are the same as those related to the previous embodiments, and hence, detailed explanation thereof will be omitted.

Meanwhile, it is explained in relation to the previous embodiments that the catalyst provided in the reactor body is formed with an oxidation catalyst, and the CO removal based on the reforming gas is made by the PROX reaction of hydrogen and oxygen. However, the inventive structure is not limited thereto. That is, in one embodiment, the catalyst may be formed with a water gas shift reaction (WGS) catalyst, and used to remove the CO.

As described above, in an embodiment a diffuser is provided to diffuse the hydrogen and air fed into the reactor body over the entire area of the catalyst so that the channeling phenomenon can be prevented, in which hydrogen and air are concentrated upon the center of the reactor body.

Consequently, the uniform oxidation reaction of hydrogen and air is made with respect to the whole catalyst in the reactor body so that the reaction efficiency of the CO remover can be further enhanced.

Furthermore, as the diffuser diffuses hydrogen and air over the entire area of the catalyst in the reactor body, the catalyst can be prevented from having reduced activity due to a concentrated, local, oxidation reaction.

Although exemplary embodiments of the invention have been described in detail hereinabove, it should be clearly understood that many variations and/or modifications which may appear to those skilled in the art will still fall within the spirit and scope of the invention, as defined in the appended claims.

What is claimed is:

1. A carbon monoxide remover comprising:
    a reactor body having an inner space;
    a catalyst in the inner space of the reactor body to react with a reforming gas; and
    a diffusion unit installed at an inlet portion of the reactor body and adapted to introduce and diffuse the reforming gas over the catalyst,
    wherein the diffusion unit comprises a diffuser having a plurality of nozzle pores and a diffuser body with gradually increasing inner diameter from a first end of the diffuser body to a second end of the diffuser body, and
    wherein the nozzle pores gradually increase in size as the nozzle pores proceed along the diffuser body from the smaller inner diameter portion of the diffuser body to the larger inner diameter portion of the diffuser body.

2. The carbon monoxide remover of claim 1 wherein the reactor body is tubular in shape having two opposite open ended portions.

3. The carbon monoxide remover of claim 1 wherein the catalyst comprises a plurality of pellet shaped structures.

4. The carbon monoxide remover of claim 1 wherein the catalyst comprises a honeycomb structure.

5. The carbon monoxide remover of claim 1 wherein the diffuser body is cone shaped.

6. The carbon monoxide remover of claim 1 wherein oxygen is fed to the reactor body and the catalyst is an oxidation catalyst for preferentially oxidizing the reforming gas.

7. A fuel cell system comprising:
an electricity generator for generating an electrical energy through the electrochemical reaction of hydrogen and oxygen;
a reformer for generating hydrogen from a fuel through the reaction of a reforming catalyst based on a thermal energy;
a carbon monoxide remover for reducing the concentration of carbon monoxide in a hydrogen-containing reforming gas generated from the reformer, comprising a reactor body with an inner space, a catalyst in the inner space of the reactor body to react with the reforming gas, and a diffusion unit at an inlet portion of the reactor body adapted to introduce and diffuse the reforming gas over the catalyst;
a fuel supply for supplying the fuel to the reformer; and
an air supply for supplying air to the electricity generator;
wherein the diffusion unit comprises a diffuser having a plurality of nozzle pores and a diffuser body with gradually increasing inner diameter from a first end of the diffuser body to a second end of the diffuser body, and
wherein the nozzle pores gradually increase in size as the nozzle pores proceed along the diffuser body from the smaller inner diameter portion of the diffuser body to the larger inner diameter portion of the diffuser body.

8. The fuel cell system of claim 7 wherein the reactor body is tubular in shape having two opposite open ended portions.

9. The fuel cell system of claim 7 wherein the catalyst in the inner space of the reactor body comprises a plurality of pellet shaped structures.

10. The fuel cell system of claim 7 wherein the catalyst in the inner space of the reactor body comprises a honeycomb shaped structure.

11. The fuel cell system of claim 7 wherein the diffuser body is cone shaped.

12. The fuel cell system of claim 7 wherein oxygen is fed to the reactor body and the catalyst in the inner space of the reactor body is an oxidation catalyst for preferentially oxidizing the reforming gas.

13. The fuel cell system of claim 7 wherein the air supply is linked to the carbon monoxide remover to supply the air into the carbon monoxide remover.

* * * * *